United States Patent [19]
Buist et al.

[11] Patent Number: 5,257,163
[45] Date of Patent: Oct. 26, 1993

[54] COMPUTER SYSTEM HAVING MONITOR WITH DETACHABLE MODULE FOR PROVIDING DIVERSE FUNCTIONALITY

[75] Inventors: Kevin S. Buist, Belle Mead; Robert J. Campesi, Flemington; Randolph W. Raine, Belle Mead; Jeffrey A. Walck, Lebanon; John Weinschenk, Edison, all of N.J.; Elisa E. Zappacosta, Media, Pa.

[73] Assignee: Unisys Corporation, Blue Bell, Pa.

[21] Appl. No.: 936,059

[22] Filed: Aug. 28, 1992

Related U.S. Application Data

[63] Continuation of Ser. No. 882,242, Jan. 17, 1992, abandoned, which is a continuation of Ser. No. 648,695, Jan. 31, 1991, Pat. No. 5,097,388.

[51] Int. Cl.$^5$ .......................... H05K 5/02; G06F 1/16
[52] U.S. Cl. ........................................ 361/729; 361/681
[58] Field of Search .............. 364/708; D14/100, 106; 439/341, 362, 928; 361/380, 390–395, 399

[56] References Cited

U.S. PATENT DOCUMENTS

| | | | |
|---|---|---|---|
| 4,387,951 | 6/1983 | Hall et al. ......................... | 439/299 |
| 4,388,671 | 6/1983 | Hall et al. ......................... | 361/391 X |
| 4,501,460 | 2/1985 | Sisler . | |
| 4,530,066 | 7/1985 | Ohwaki et al. ..................... | 364/708 |
| 4,547,835 | 10/1985 | Pansaerts et al. .................. | 361/399 |
| 4,680,674 | 7/1987 | Moore .............................. | 361/395 |
| 4,734,874 | 3/1988 | Hwang et al. ..................... | 361/391 X |
| 4,853,807 | 8/1989 | Trager ............................. | 361/380 X |
| 4,893,263 | 1/1990 | Myers .............................. | 364/708 |
| 5,044,963 | 9/1991 | Kukkonen et al. .................. | 439/55 |
| 5,097,388 | 3/1992 | Buist et al. ....................... | 361/393 |

FOREIGN PATENT DOCUMENTS 0407068 1/1991 European Pat. Off. ............ 361/380

Primary Examiner—Leo P. Picard
Assistant Examiner—Michael W. Phillips
Attorney, Agent, or Firm—Albert B. Cooper; Mark T. Starr

[57] ABSTRACT

A monitor is transformed into a predetermined type of digital computer system by attaching a personality module to the rear thereof. The module contains one or more circuit cards for imparting the desired personality to the system. The monitor includes an internal power supply for providing power to the module. Mating video and power connectors are included at the interface surfaces of the monitor and module for conveying video signals from the module to the monitor and power from the monitor to the module. Apertures at the top of the rear mounting surface of the monitor engage hooks at the top of the mounting surface of the module to form a disengagable hinged interface therebetween. Apertures are included at the bottom of the mating surface of the monitor for engaging rotary latches disposed at the bottom of the module. Each rotary latch comprises a triple-cut lead screw engaged in a nut captured in the module. A locking lever orthogonal to the lead screw imparts locking and unlocking rotation thereto. A latching tab coupled with the lead screw engages the associated aperture at the bottom of the monitor. The module is attached to the monitor by rotating the levers so that the lead screws impart sufficient travel to the latching tabs to pull the mating surfaces of the monitor and module together. Detents maintain the lead screw latches in the locked or unlocked position against axial forces tending to unscrew the lead screws from the nuts.

21 Claims, 6 Drawing Sheets

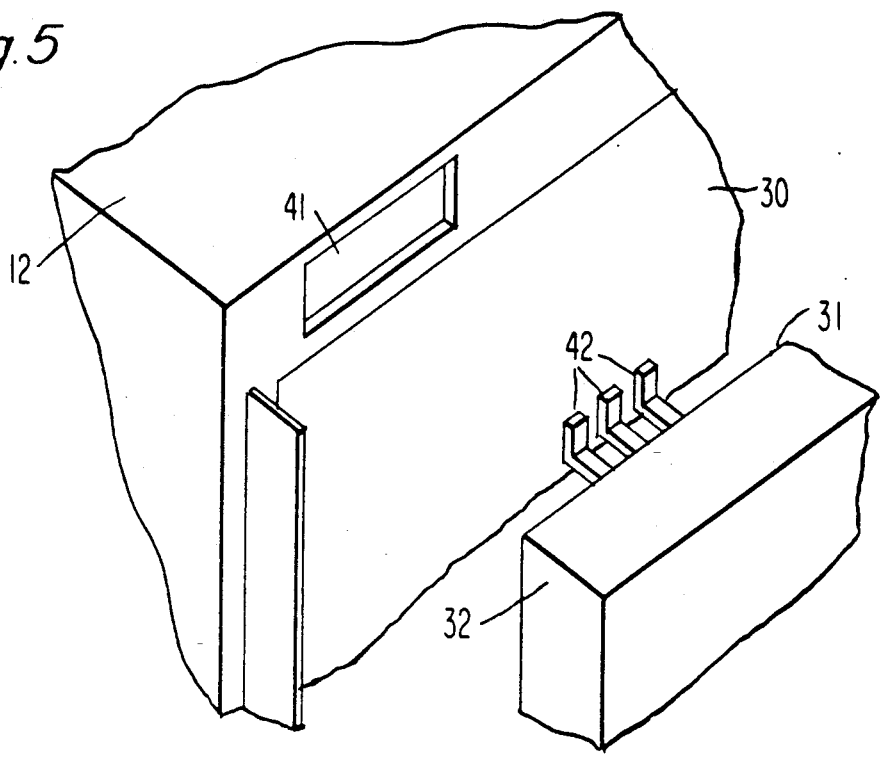
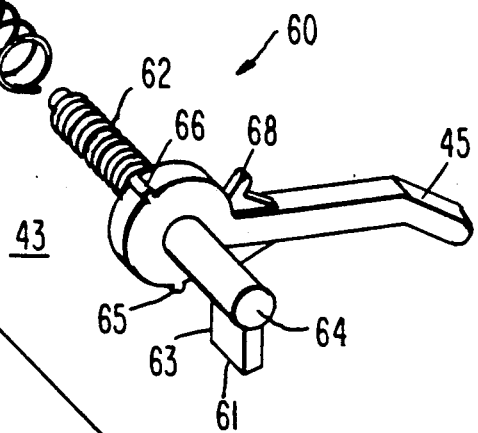

COMPUTER SYSTEM HAVING MONITOR WITH DETACHABLE MODULE FOR PROVIDING DIVERSE FUNCTIONALITY

This is a continuation of copending application Ser. No. 07/882,242, filed on Jan. 17, 1992 (now abandoned); which is a continuation of Ser. No. 07/648,695, filed on Jan. 31, 1991 (now U.S. Pat. No. 5,097,388).

BACKGROUND OF THE INVENTION

1. Field of the Invention

The invention relates to digital computer systems particularly with respect to work stations, personal computers (PC), terminals and the like.

2. Description of the Prior Art

Traditional mid to low end digital computer architecture comprises a monitor and a processor or CPU in a separate enclosure. Interface circuitry may also be included for interfacing the system to, for example, a LAN. The interface circuitry may also utilize a separate enclosure. The enclosures are interconnected by standard cabling and, traditionally, the monitor and processor each contains its own power supply. This architecture is commonly used in PCs, work stations, terminals and the like. The ubiquitous architecture described has numerous disadvantages. Such a multiple enclosure configuration tends to have an undesirably large foot print. For example, in a desk top system the CPU enclosure occupies a large amount of valuable office desk space. Additionally, such multiple enclosure configurations tend to be volumetrically wasteful with concomitant undesirable cost.

The prior art architecture requires large numbers of cables extending between the enclosures. This is undesirable not only because of the cost of such cabling, but also because of the electro-magnetic interference (EMI) certification that commercial equipment must undergo. The cabling and cable connectors are a source of noise which is difficult to eliminate. Expensive filtering is often required to reduce the EMI level to acceptable standards.

As described above, in conventional configurations the monitor and the processor each contains its own power supply. Such a power supply arrangement tends to be wasteful of space and cost because of duplication of components. This arrangement also engenders a disadvantage with respect to heat dissipation. Most of the heat, in such systems, is generated from the power supply. Monitors normally provide adequate heat dissipation by simple convection cooling. This is because the monitor enclosure is typically elevated on a pedestal so that appropriately placed cooling slots through the enclosure walls provide adequate free air convection current cooling. The power supply in the CPU enclosure, on the other hand, requires a cooling fan to dissipate the heat. This is because the processor enclosure normally is positioned flat on a desk top, thereby interfering with adequate free air convection cooling. Such cooling fans tend to add to the cost of the equipment and tend to be undesirably noisy. The cooling fan causes the distinctive hum associated with conventional PCs.

In addition to the above, a primary disadvantage of the described prior art architecture is that investments in equipment are traditionally lost when a system configuration is upgraded, or otherwise modified. For example, a PC upgrade involving obtaining new processor technology usually renders the entire CPU enclosure with its power supply obsolete.

It is appreciated from the foregoing, that the present day monitor does not perform any function unless one or more separate system components in separate enclosures are utilized therewith and connected thereto by standard cabling with all of the attendant disadvantages described above. For example, a standard VGA monitor connects to the parallel port of a CPU via a VGA cable connecting the VGA monitor port to the CPU parallel port.

A prior art system may be considered as having a "personality" in accordance with the functionality that it is designed to perform. For example, a system can have the personality of a PC, a terminal or a work station. The system can have the 10-Mhz personality of a 286 processor, or the enhanced performance personality of a 20-Mhz 386 system. Generally, the personality of a system is fixed in accordance with the components assembled and interconnected to comprise the system. Changing the personality of the system generally entails replacing significant portions of the system with new components. Heretofore, there has not been any simple, easily implemented and economical way of changing the personality of an existing system.

SUMMARY OF THE INVENTION

The above described disadvantages of the prior art are obviated by a digital computer system, having personality attributes, comprising a monitor and a personality module that is attachable to, and detachable from the monitor. The personality module includes at least one circuit card for imparting the personality attributes to the system. A power supply internal to the monitor provides power for the monitor and the personality module. A display signal connector on the monitor and a corresponding connector on the personality module mate together when the personality module is attached to the monitor. The personality module provides display signals to the monitor through the mated display signal connectors. The display signal connector on the monitor conforms to a standard protocol for monitor input connectors. Similarly, the monitor includes a power connector coupled to the internal power supply and the personality module includes a corresponding power connector. The power connectors mate together when the personality module is attached to the monitor for providing power to the personality module. A latch mechanism on the monitor and personality module engage when the personality module is attached to the monitor so as to urge the module toward the monitor to engage the display signal connectors with respect to each other and the power connectors with respect to each other. When the personality module is detached from the monitor, the latching mechanism urges the personality module away from the monitor so as to disengage the electrical connectors. Preferably, the personality module is attached at the back of the monitor with a disengageable hinge mechanism at the top thereof and a multiple-cut or multiple thread lead screw latch mechanism at the bottom thereof.

The monitor itself is configured as a standard monitor and can connect in a conventional manner by conventional cabling to an external standard component, such as a CPU, via the display signal connector. The personality module can transform the monitor into a wide variety of configurations, such as a LAN work station, a stand-alone PC, a terminal, and the like.

Since the power supply for the personality module is located in the monitor, convection cooling is adequate to provide heat dissipation for the assembled system. The system therefore does not require a cooling fan.

BRIEF DESCRIPTION OF THE DRAWINGS

FIG. 5 is a three-dimensional view illustrating details of the detachable hinge interface between the monitor and personality module.

FIGS. 6 and 7 are exploded three-dimensional views, partially in section, illustrating details of the multiple-cut lead screw latch interface between the monitor and the personality module.

DESCRIPTION OF THE PREFERRED EMBODIMENT

Figure 1:
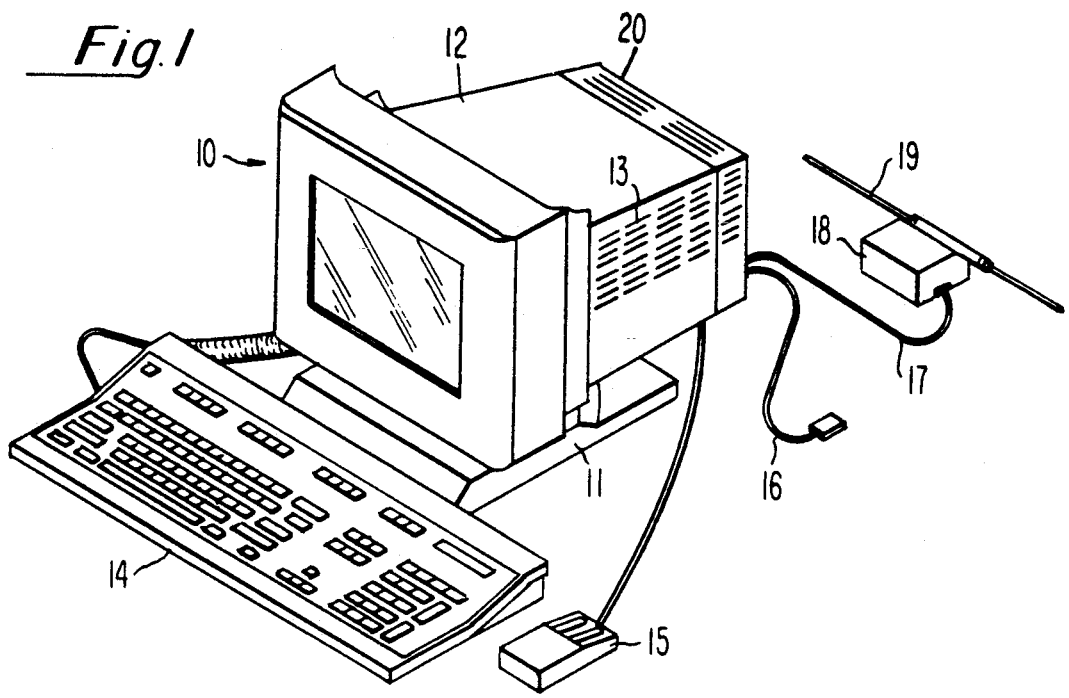
FIG. 1 is a three-dimensional view of a LAN workstation utilizing the personality module of the present invention.

Referring to FIG. 1, an exemplary digital computer system configured in accordance with the present invention is illustrated. The exemplified system is a LAN workstation. The system includes a video monitor 10 conventionally mounted on a pedestal 11. The monitor 10 includes an enclosure 12 with convection cooling slots 13 therethrough. A keyboard 14, mouse 15 and AC power cable 16 are conventional elements of the system connected thereto in a conventional manner. The LAN workstation illustrated in FIG. 1 couples in a conventional manner via a drop cable 17 and a Medium Attachment Unit 18 to a LAN coax cable 19.

In accordance with the invention, a personality module 20 is mechanically and electrically attached to the rear of the monitor enclosure 12. In a manner to be described, the module 20 is attachably and detachably mounted to the monitor 10. In the embodiment illustrated, the module 20 comprises a CPU and OMNInet module including all of the processing circuitry required for PC operation as well as interfacing to the monitor 10 and the LAN coax cable 19. Thus, the monitor 10, by the attachment of the personality module 20, is transformed into a fully functional PC with workstation attachability to a LAN. The personality module 20 may, for example, contain a 80286 processor and memory circuit card, as well as a VGA graphics card and a LAN control card.

It is appreciated that by the attachment of the module 20, the monitor 10 is imparted with the "personality" of a fully functional PC operational as a LAN workstation. Utilizing an appropriate personality module, the monitor 10 can acquire the functionality of a stand-alone PC, a terminal, or the like. The enclosure volume required for the complete system is only slightly greater than that required for the monitor 10 alone. The system, however, retains the footprint required for the monitor 10, thus occupying less valuable office desk space than conventionally configured systems.

It is appreciated that the system illustrated in FIG. 1 does not require or utilize the separate CPU or processor enclosure traditionally required in PC systems. The power supply and cooling fan normally included in the CPU enclosure are not required in the system of the present invention for reasons to be discussed. Additionally, the system of the present invention does not require the video and power cabling normally interconnecting a PC monitor and CPU.

Figure 2:
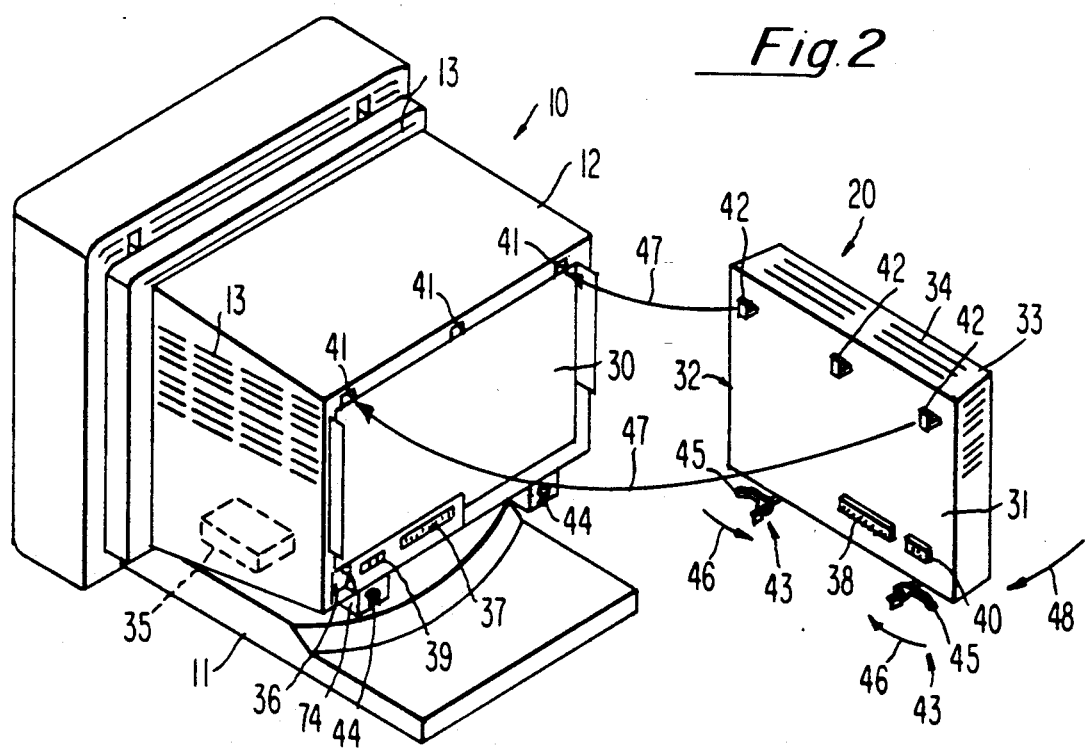
FIG. 2 is a three-dimensional view illustrating the monitor and detached personality module in accordance with the present invention.

Referring to FIG. 2, in which like reference numerals indicate like components with respect to . FIG. 1, a three-dimensional view of the system of the present invention with the personality module 20 detached from the monitor 10 is illustrated. The monitor 10 includes a rear surface 30, and the module 20 includes a rear surface 31 which are adjacent each other when the module 20 is attached to the monitor 10. The surface 30 of the monitor 10 may be considered as a personality module mating surface, and the surface 31 of the monitor 20 may be considered as a monitor mating surface. The personality module 20 is comprised of a module base 32 and a module cover 33. The module base is utilized for mounting the circuit card or cards within the module 20 that impart the digital computer functionality to the system. The module mating surface 31 is the outer surface of the module base 32. The module cover 33 has convection cooling slots 34 therethrough and the monitor 10 includes an internal power supply 35 for providing power thereto, as well as to the personality module 20.

The monitor 10 includes an AC power receptacle 36 which accepts the AC power cable 16 (FIG. 1). By this means AC power is applied to the power supply 35. A DC power connector 37 is disposed at the rear of the monitor 10 for conveying power from the power supply 35 to the personality module 20. Power is provided to the personality module 20 from the connector 37 via a mating connector 38 at the rear surface 31 of the module 20. Thus, the personality module 20 does not contain a separate power supply or the cooling fan traditionally utilized therewith.

Also disposed at the rear of the monitor 10 is a video connector 39 for receiving display signals from the personality module 20, such as the video and timing signals required to operate the monitor 10. The pin-out for the video connector 39 conforms to an industry standard interface protocol such that the monitor 10 can be utilized in a conventional manner with a separate conventional CPU by interconnecting the monitor 10 therewith through industry standard cabling. For example, the video connector 39 can conform to the VGA standard. The monitor display signals, such as video and timing, are provided to the connector 39 via a mating connector 40 at the rear surface 31 of the personality module 20. The pin-out of the connector 40 does not conform to an industry standard protocol for the monitor port of a PC/CPU. Instead, the pin-out of the connector 40 is configured in accordance with the mirror image of the industry standard interface protocol utilized for the connector 39. When the monitor 10 is utilized in a conventional manner with a separate external CPU, the power connector 37 is not utilized since the external CPU normally contains its own power supply, which traditionally requires a fan for CPU cooling.

The monitor enclosure 12 includes apertures 41 disposed at the top rear thereof and the module 20 includes hooks 42 disposed at the rear surface 31 thereof for engaging the apertures 41. The hooks 42 and the apertures 41 form a latch mechanism for coupling the module 20 to the monitor 10 at the upper edge thereof. The hooks 42 disposed into the apertures 41 form a firmly engaging and disengagable hinged interface for the top mechanical connection of the module 20 to the monitor 10.

Disposed at the bottom of the module 20 are multiple lead screw latches 43 which engage with keyhole shaped apertures 44 disposed at the bottom of the monitor enclosure 12. The latches 43 include locking levers 45, which are illustrated in the unlocked positions thereof. The levers 45 are rotated in the directions of arrows 46 to the locking positions thereof.

When assembling the module 20 to the monitor 10, the module 20 is rotated in the direction of arrows 47, so that the rear surface 31 of the module 20 faces the rear surface 30 monitor 10. The bottom of the module 20 is rotated away from the monitor 10 and the hooks 42 are engaged into the apertures 41. The bottom of the module 20 is then rotated toward the monitor 10 in the direction of arrow 48 until the latches 43 engage into the apertures 44 with the connectors 37 and 38 and the connectors 39 and 40 properly mated. The locking levers 45 are then rotated in the direction of the arrows 46 to the locked positions thereof. In a manner to be described in detail below, when the locking levers 45 of the latches 43 are rotated from the unlocked positions illustrated to the locked positions thereof, sufficient travel and force are generated to ensure effective electrical mating of the connectors 37 and 38 and the connectors 39 and 40.

Figure 3:
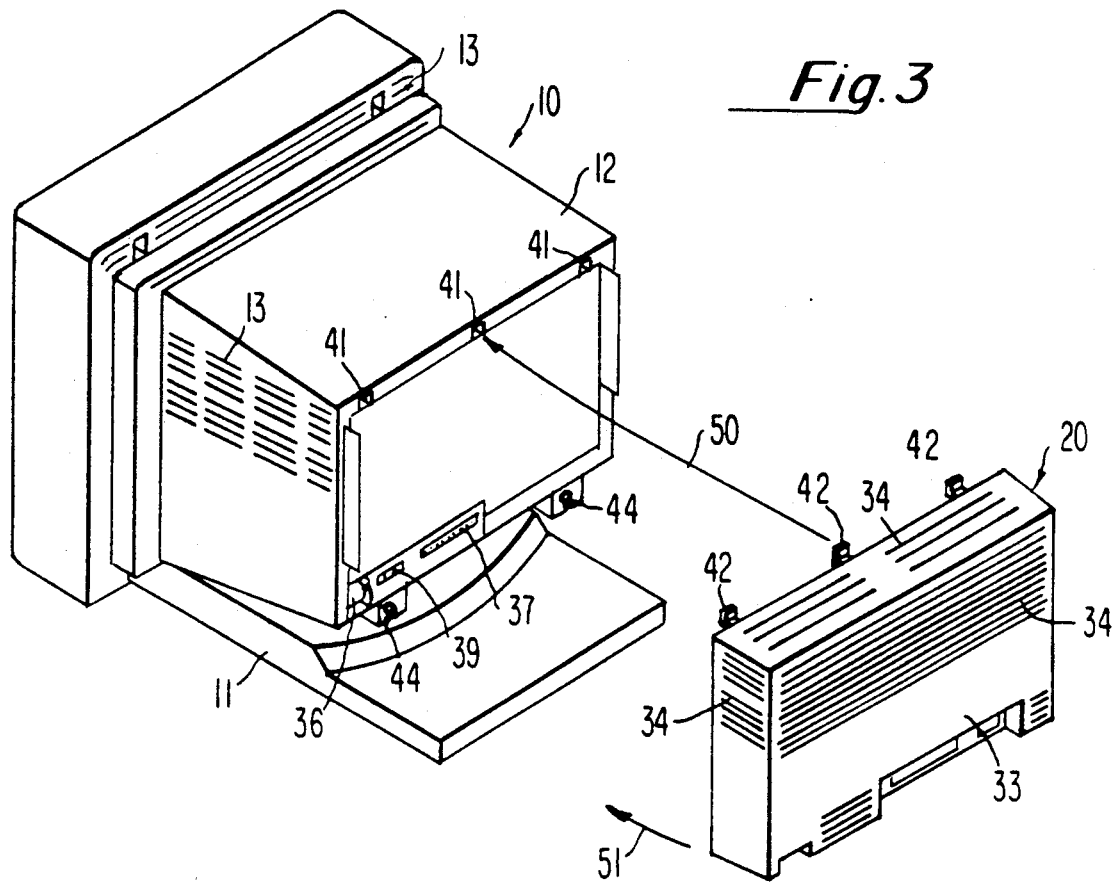
FIG. 3 is a three-dimensional view of the monitor and personality module of the present invention illustrating the module positioned for attachment to the monitor.

Referring to FIG. 3, in which like reference numerals indicate like components with respect to FIG. 2, a three-dimensional rear view of the system of the present invention is illustrated with the personality module 20 in the process of being attached to the monitor 10. The top of the module 20 is moved in the direction of arrow 50, so that the hooks 42 engage into the apertures 41. The bottom of the module 20 is then rotated in the direction of arrow 51 to appropriately position the module 20 with respect to the monitor 10, so that the attachment process described above can be completed.

Figure 4A:
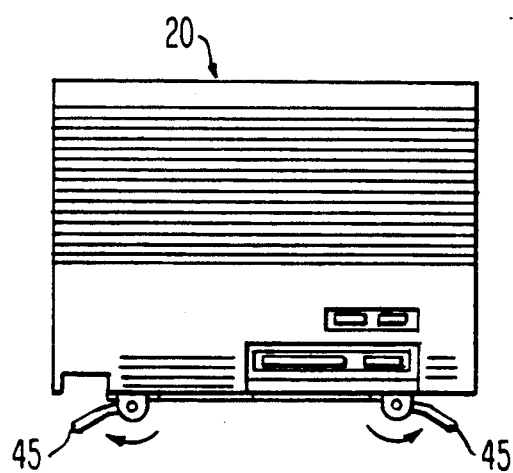
FIGS. 4a and 4b are rear elevation views of the personality module attached to the monitor illustrating the open and locked positions of the locking lever latches, respectively.
Figure 4B:
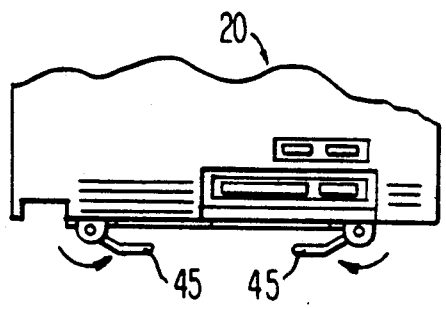

FIGS. 4a and 4b illustrate a rear elevation view of the module 20. FIG. 4a illustrates the locking levers 45 in the open positions thereof and FIG. 4b illustrates the locking levers 45 in the locked positions thereof. It is appreciated that when the module 20 is in the process of being attached to the monitor 10, the levers 45 are in the positions illustrated in FIG. 4a and are rotated inwardly to the positions illustrated in FIG. 4b to lock the module 20 to the monitor 10. When detaching the module 20 from the monitor 10, the locking levers 45 are rotated outwardly from the positions illustrated in FIG. 4b to the positions illustrated in FIG. 4a and the bottom of the module 20 is rotated away from the monitor 10. The hooks 42 are then disengaged from the apertures 41 to complete the module detachment process.

Referring to FIG. 5, in which like reference numerals indicate like components with respect to FIG. 2, a section of the monitor enclosure 12 and the module base 32 is illustrated showing details of the hinged interface providing the top mechanical connection of the module 20 to the monitor 10. The hook 42, which may comprise multiple hooks as illustrated, engages into the aperture 41 to provide the firmly engaging and easily disengaging hinged interface discussed above.

Figure 6:
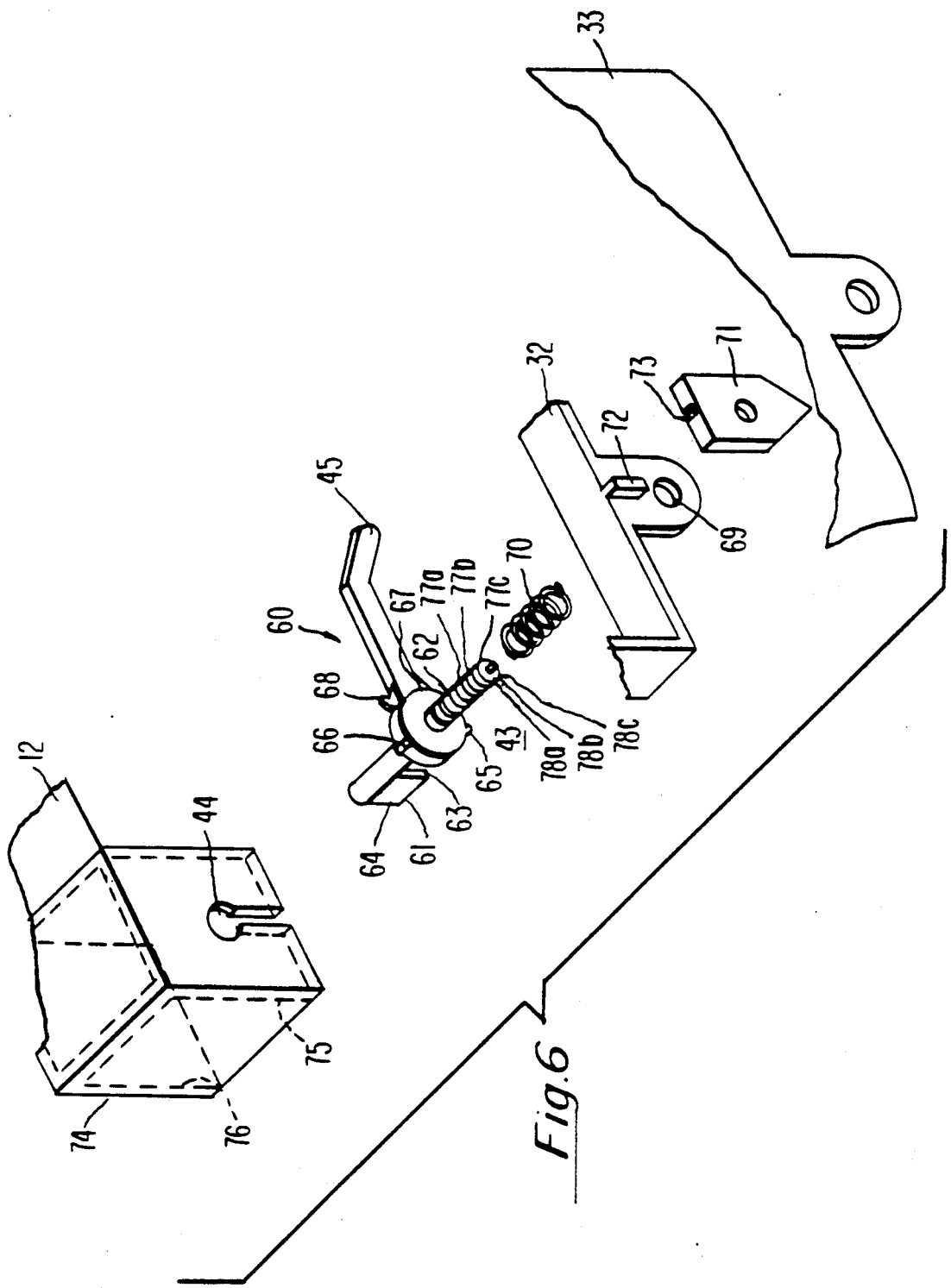

Referring to FIG. 6, in which like reference numerals indicate like components with respect to FIG. 2, an exploded view of the latch mechanism 43 is illustrated. The latch includes a one-piece member 60 comprised of the locking handle 45, a latching tab 61 and a multiple-cut lead screw 62. The multiple-cut lead screw 62 has multiple lead threads 77a, b and c cut therein that are interleaved and parallel with respect to each other with respective leads 78a, b and c. The latching tab 61 includes attachment bearing surface 63 and detachment bearing surface 64. The element 43 also includes locking protuberances 65 and 66, as well as stops 67 and 68. The latch element 43 is preferably fabricated from either glass reinforced plastic or Lexan by an injection molding process. In the preferred embodiment, the multiple-cut lead screw 62 comprises a triple-cut lead screw with three lead threads.

It is appreciated that the multiple-cut lead screw 62 has relatively steeply pitched threads resulting in increased axial travel of the screw per increment of rotation compared to more conventional single-cut threads. In the preferred embodiment of the invention, the triple lead screw 62 exhibits three times the axial travel of a conventional single-cut screw for the same amount of rotation. Because of this property, the lever 45 can be rotated through 180° to provide sufficient travel to effectively mate the module 20 onto the monitor 10 (FIG. 1).

Because of the steep pitch of the multiple-cut threads of the lead screw 62, relatively small axial forces tend to cause the element 43 to unscrew. The protuberances 65 and 66 cooperate with locking fingers (to be later illustrated and described) on the module base 32 to function as detents preventing the module 20 from unintentionally detaching from the monitor 10. The stops 67 and 68 limit the rotation of the locking lever 45 to approximately 180° in a manner to be described.

The triple lead screw 62 is inserted through a hole 69 at the bottom of the module base 32 with a spring 70 disposed around the screw 62. The screw 62 is assembled into a mating nut 71, which is captured between the module base 32 and the module cover 33. The nut 71 is, accordingly, a triple-lead thread nut and is utilized to attach the latch assembly 43 to the personality module 20. The module base 32 has a key 72 and the nut 71 has a mating keyway notch 73 to appropriately locate and orient the nut 71 during assembly of the module 20. The key 72 and keyway 73 also prevent the nut 71 from spinning as the latch 43 is turned and provides the nut 71 with stability during attachment and detachment of the module 20. The spring 70 is utilized to reduce play in the latch assembly 43 with respect to the module base 32, tending to align the assembly 43 such that the latching tab 61 enters the opening 44 of the monitor 10 during the module-to-monitor attachment procedure.

The aperture 44 is in a box shaped extension 74 of the monitor enclosure 12. The aperture 44 is keyhole shaped to accommodate the key shaped latching tab 61. The extension 74 includes a module attachment bearing surface 75 and a module detachment bearing surface 76. During attachment of the module 20 to the monitor 10, the handle 45 is in the unlocked position as illustrated. The bottom edge of the module 20 is moved toward the monitor 10 and the latching tab 61 is inserted into the aperture 44. The locking lever 45 is rotated clockwise, as viewed in the drawing, and the bearing surface 63 engages the bearing surface 75. As the locking lever 45 is rotated, the module base 32 and the attached module cover 33 are urged toward the monitor 10 as the multiple lead screw 62 turns within the nut 71. When the locking lever 45 has been rotated approximately 180° the module 20 is locked to the monitor 10 (FIG. 1). The bearing surface 63 is curved so as to effectively engage the surface 75. It is appreciated that during the attachment process, all of the latching stress is born by the bearing surface 63.

During the module detachment process, the locking lever 45 is rotated from the locked position to the unlocked position illustrated in FIG. 6. The screw 62 unscrews from the nut 71 and the surface 64 bears against the surface 76 to urge the module base 32 and attached module cover 33 away from the monitor 10. This procedure disengages the electrical connectors 37-40 (FIG. 2). The surface 64 bears all of the stress during the module detachment procedure.

The latch assemblies 43 (FIG. 2) comprise a left-handed assembly and a right-handed assembly on the left side and right side, respectively, of the personality module 20 as viewed facing the surface 31 of the module base 32. The assembly on the left side utilizes a left-handed multiple-cut lead screw 62 and corresponding left-handed nut 71, whereas the assembly on the right side utilizes a right-handed multiple-cut lead screw 62 and corresponding right-handed nut 71. The right-handed and left-handed assemblies are utilized so that the locking and unlocking rotations illustrated in FIGS. 4a and 4b, are achieved; that is, locking the module 20 to the monitor 10 by rotating the locking levers 45 toward the center of the module, and unlocking the module 20 by rotating the locking levers 45 toward the outer edges thereof.

Figure 8:
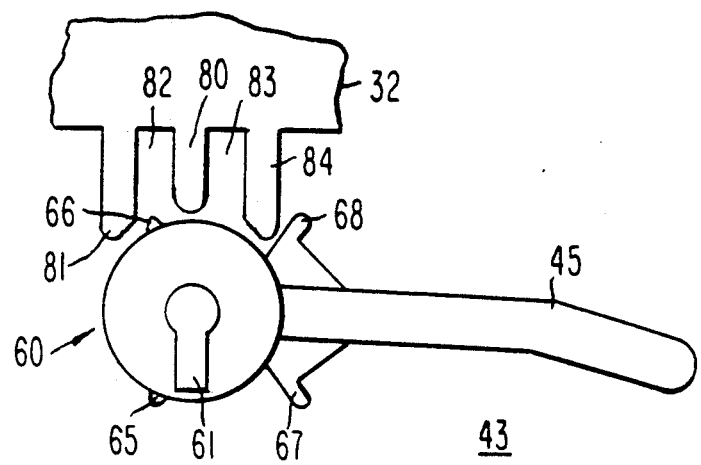
FIG. 8 is an elevation view illustrating further details of the lead screw latch mechanism of the present invention.

Referring to FIGS. 7 and 8, like reference numerals indicate like components with respect to FIGS. 2 and 6. In FIG. 7, the latch assembly 43 is viewed from a direction opposite that illustrated in FIG. 6 and in FIG. 8 an elevation view of the latch 43 corresponding to the view of FIG. 7 is illustrated. It is appreciated that the latch assembly of FIG. 6 is left-handed, whereas the latch assembly of FIGS. 7 and 8 is right-handed. As previously discussed, small axial forces tend to unscrew the steeply pitched triple-lead screw 62 from the nut 71. A finger 80 on the module base 32 in combination with the protuberances 65 and 66 function as detents for maintaining the locking lever 45 stably in either the unlocked position or the locked position. FIGS. 7 and 8 illustrate the unlocked position of the latch 43. In this position, the protuberance 66 and the finger 80 prevent the latch member 60 from rotating in a clockwise direction. The protuberance 66 is captured between the finger 80 and a finger 81 in a space 82 therebetween.

The finger 80 is sufficiently resilient such that when the locking lever 45 is rotated clockwise from the unlocked position shown, to the locked position 180° displaced therefrom, the protuberance 66 moves out of the detent defined by the space 82 displacing the finger 80 to the right until the detent is cleared. The resiliency of the finger 80 returns it to its undisplaced position. As the locking lever 45 is rotated clockwise to the locked position, the protuberance 65 displaces the finger 80 to the right to become locked in a space 83 between the finger 80 and a finger 84. Thus, the finger 80 and the protuberance 65 function as a detent for maintaining the latch 43 in the locked position, preventing the latch mechanism 43 from inadvertently rotating out from the nut 71 when in the locked position.

The finger 84 in combination with the stop 68 function as a positive stop of counter-clockwise rotation preventing over-rotation and consequent damage to the latch. The finger 81 and the stop 67 function in a similar manner for clockwise rotation.

Figure 9:
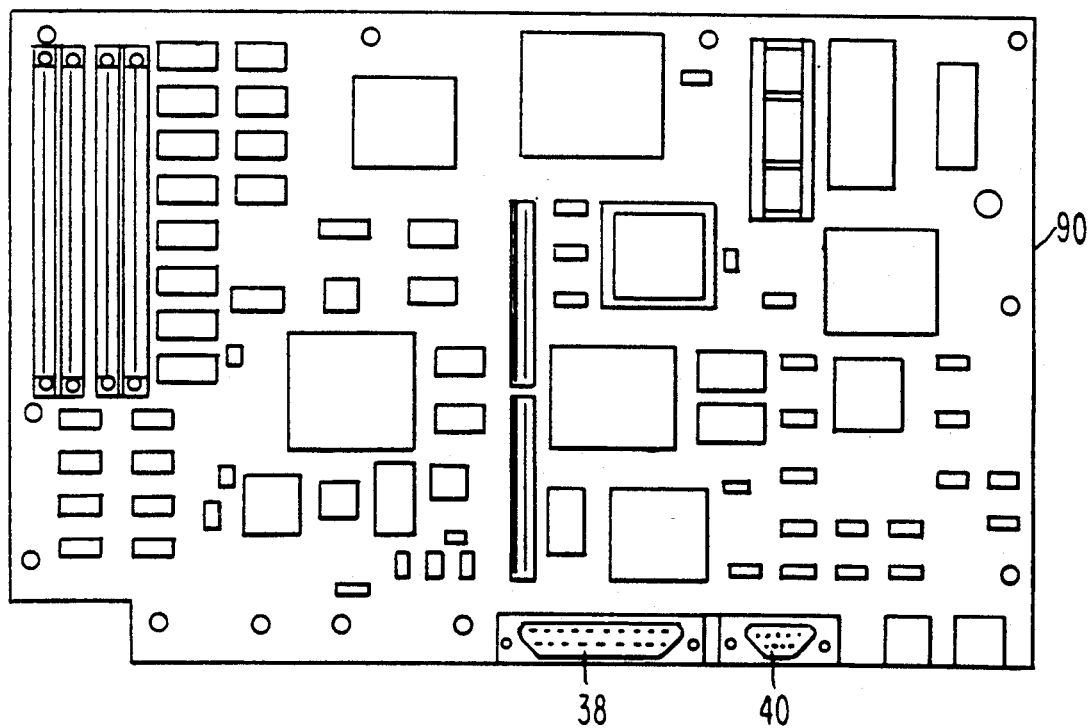
FIG. 9 is a plan view of a circuit card utilized in the personality module of the present invention.

Referring to FIG. 9, a plan view of a CPU board 90 that may be utilized in the personality module 20 is illustrated. The power connector 38 and the video connector 40 are illustrated mounted to the underside of the board 90. These connectors are mounted to the underside of the board 90 so that they may project from the rear of the module 20 through the module base 32, so as to mate with the monitor connectors 37 and 39.

Figure 10:
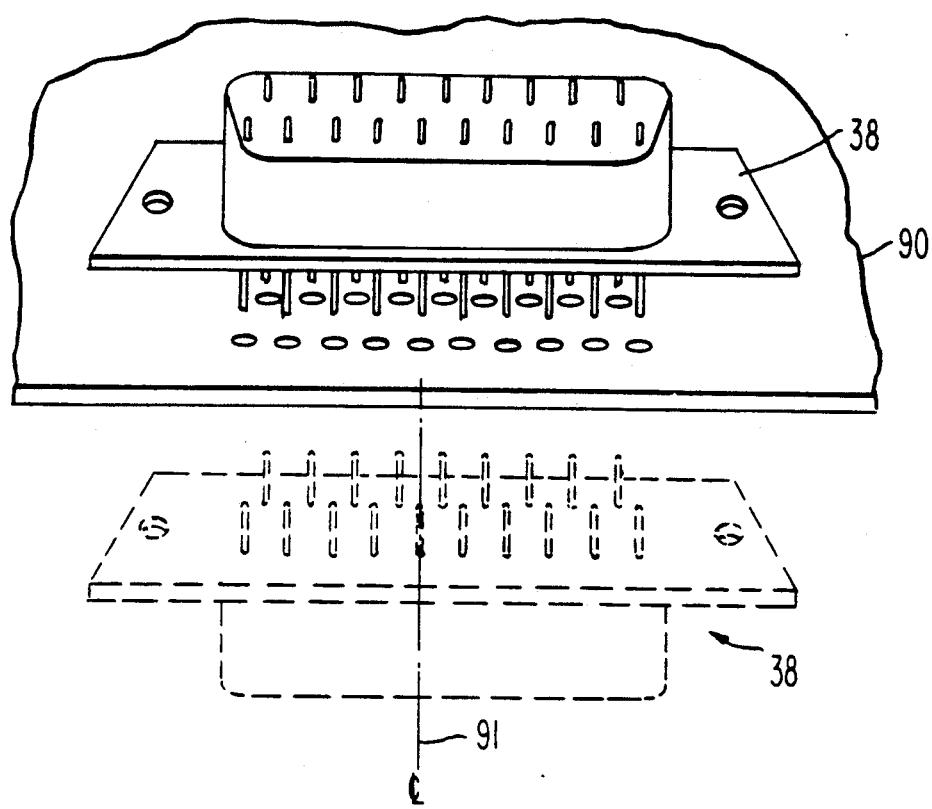
FIG. 10 is a three-dimensional view of a portion of the circuit card of FIG. 9 illustrating further details of the present invention.

The CPU board 90 is mass produced and it is desirable also to utilize the board in a conventional stand-alone CPU enclosure. In such an arrangement, it is necessary to mount the connectors 38 and 40 to the topside of the circuit card 90 with the connectors extending out the back of the stand-alone CPU chassis. FIG. 10, illustrates a portion of the board 90 with the connector 38 illustrated on the underside thereof preparatory to soldering in place. The connector 38 is also illustrated in phantom view preparatory to soldering to the top surface of the board 90. It is appreciated that the connectors 38, illustrated in solid line and in phantom, are the same connector. Alternatively, the connector illustrated in phantom may be of right-angle design, such that the connector can extend out the back of the stand-alone CPU chassis.

This dual manufacturing requirement creates a problem with respect to the power connector 38 in that the pin-out configuration for one arrangement would be different from the pin-out configuration for the other arrangement. Thus, with appropriate pin-out of the connector 38 for direct connection of the module 20 to the monitor 10, the pin-out configuration of the connector 38 mounted on the opposite side of the board 90 would be inappropriate for cable connection of the stand-alone CPU to the monitor 10. In other words, there is a difference in signals from the connector 38 depending on which side of the board 90 it is mounted.

Figure 10A:
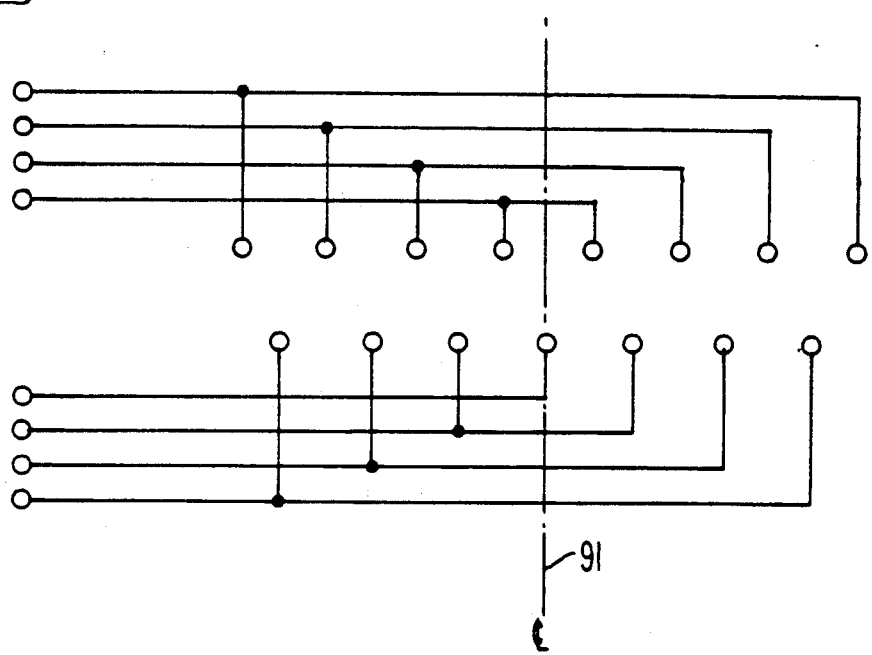
FIG. 10a is a wiring diagram of the solder connections of the circuit card of FIG. 10 illustrating the symmetrical connection thereof in accordance with an aspect of the present invention.

In order to utilize the same circuit card for the traditional separate enclosure configuration as for the personality module architecture described herein, a symmetrical pin-out arrangement is utilized with respect to the connector 38 and the associated solder holes on the card 90. The same electrical signals are utilized symmetrically with respect to a center line 91. FIG. 10a, illustrates the symmetrical wiring utilized. Thus, for mounting of the connector 38 either to the top or underside of the board 90, the same connecting wire to the board carries the same signal.

As discussed above and with continued reference to FIGS. 9 and 10, when the CPU board 90 is utilized in a conventional stand-alone CPU enclosure, it is also desirable to mount the video connector 40 to the top side of the circuit card with the connector extending out the back of the stand-alone CPU chassis. Similar to that discussed with respect to the power connector 38, the video connector 40 may be of straight or right-angle design.

The video connector 39 (FIG. 2) can, for example, conform to the VGA standard so that the monitor 10 may be utilized as a standard, stand-alone, VGA monitor for connection to a conventional PC via conventional VGA cabling. It is appreciated that the standard VGA cable cross-connects the pins of the connectors at either end of the cable to provide a proper interface between VGA monitors and PCs. The pin-out of the connector 40 when utilized in the module 20 for direct connection to the rear of the monitor 10 is the mirror image of the VGA output connector standard so that appropriate connection is effected between the connectors 39 and 40. A standard VGA cable could not be utilized to provide the proper interface between the connector 39 and the connector 40 when the video pin-out of module 20 is configured for direct connection to the monitor 10.

In a stand-alone CPU enclosure, however, when the video connector is mounted to the top side of the circuit card 90, the proper pin-out is provided for a standard VGA cable because the VGA pin-out on one side of the card is the mirror image of the VGA pin-out on the other side of the card. Thus, the standard VGA connector can be utilized on the underside of the circuit card 90 when the module 20 is to be directly connected to the rear of the monitor 10 in accordance with the present invention. When it is desirable to utilize the circuit card 90 in a stand-alone CPU arrangement, it is only necessary to mount the VGA connector to the top side of the board in the same solder holes to effect appropriate pin-out for this arrangement.

It is appreciated that the connectorization concept with respect to the power connector is different from that of the video connector. With the power connector, a symmetrical pin connection arrangement, as described above, is utilized. The symmetry used in the power connector is not required or utilized in the video connector since the two required video pin-outs are mirror images of one another and are effected when the video connector is mounted on the appropriate side of the board.

Thus, the monitor 10 can be utilized as a standard stand-alone VGA monitor connected to a conventional PC via conventional cabling. It is appreciated that the video connector can be soldered onto either side of the same circuit card. The connection on one side is for the purpose of attaching the module 20 containing the card directly to the rear of the monitor 10. The connection on the other side is to correctly provide signals to a conventional VGA cable, and in turn, to a conventional VGA monitor. Thus, the same circuit card is utilizable in different enclosures in configurations for providing alternative products.

As discussed above, the monitor 10 may be utilized in a conventional computer architecture with a stand-alone CPU enclosure. In that arrangement, a cover (not shown) may be provided to appropriately close the back surface 30 of the monitor 10, leaving the video connector 39 and the AC power receptacle 36 exposed for conventional cable connection.

It is appreciated from the foregoing, that the monitor 10 with the personality module 20 attached thereto is a fully functional PC with, for example, an 80286 processor, a built-in LAN control card and VGA graphics without the usual central processing enclosure. The "personality pack" 20 which snaps onto the back of the monitor 10 includes all of the processing elements and network interface facilities required. All power for the personality module 20 is obtained from the power supply 35 within the monitor 10. The cooling fan normally utilized in a separate CPU enclosure is not required in the architecture of the present invention. Since both the monitor 10 and the attached personality module 20 are mounted on the pedestal 11, and hence are elevated above the desk top, adequate convection cooling is obtained from the convection cooling slots 13 and 34. Thus, the disclosed system utilizing the architecture of the present invention does not require the cooling fan which causes the distinctive hum traditionally associated with conventionally configured PC architectures. Additionally, as described above, the monitor 10, without a personality module 20, can function as a standard monitor, such as a VGA monitor, via standard cabling, such as VGA interface cables.

A principle advantage of the architecture of the present invention is that it is significantly less expensive to upgrade a system configured in accordance with the invention than a system configured in accordance with conventional architecture. A user, after making an initial purchase, can upgrade from one personality module to another with minimal expense. For example, a user could convert his equipment from a terminal to a LAN workstation and thereafter to a future more powerful LAN workstation. The user could convert the equipment from one type of terminal to another type while retaining the initial monitor investment. The user could begin with a PC having an 80286 processor module and later upgrade the system to an 80386 technology merely by replacing the personality module.

Unlike conventional PC architectures, the power supply that provides the power for the personality module is inside the monitor. In conventional architectures, a separate and generally large enclosure is utilized with its own power supply (and cooling fan) which is attached to the monitor by cables. A significant upgrade in a conventionally configured PC system, such as upgrading the processor technology, usually requires discarding the entire CPU enclosure (and perhaps cabling) and replacing these expensive components with the upgraded equipment. With the architecture of the present invention, a substantial upgrade merely requires replacing the personality module which is significantly less expensive than a conventional CPU enclosure including the power supply, cooling fan and cabling.

On the other hand, the monitor of the present invention with the power supply for the personality module is only slightly more expensive than a conventional VGA monitor which only has a power supply for its own functions. Thus, an upgrade from, for example, a monochrome video monitor to a color video monitor would be only slightly more expensive than a comparable upgrade in a conventional architecture. The same personality module would be utilized in the upgraded system.

While the invention has been described in its preferred embodiment, it is to be understood that the words which have been used are the words of description rather than limitation and that changes may be made within the purview of the appended claims without departing from the true scope and spirit of the invention in its broader aspects.

We claim:

1. A digital computer system having personality attributes comprising:
   a monitor having monitor electrical connector means accessible at the exterior thereof,
   said monitor including an internal power supply and said monitor electrical connector means including a power output connector coupled to said internal power supply,
   personality module means having circuit card means therein for imparting said personality attributes to said system and for providing display signals for said monitor, said personality module means having module electrical connector means accessible at the exterior thereof for mating with said monitor electrical connector means, said module electrical connector means being electrically coupled to said circuit card means,
   said module electrical connector means including a power input connector for mating with said power output connector to receive power for said personality module means from said internal power supply of said monitor,
   said power input connector being electrically coupled to said circuit card means, and
   coupling means for coupling said personality module means to said monitor so that said module electrical connector means engages with said monitor electrical connector means to couple said display signals from said module to said monitor, and to couple said power from said power supply in said monitor to said module.

2. The system of claim 1 wherein said monitor electrical connector means includes a display signal input connector, and
   said module electrical connector means includes a display signal output connector for mating with said display signal input connector for supplying said display signals thereto,
   said display signal output connector being electrically coupled to said circuit card means,
   said coupling means being operative for coupling said personality module means to said monitor so as to engage said display signal output connector with said display signal input connector and said power input connector with said power output connector, and for decoupling said personality module means from said monitor so as to disengage said display signal output connector from said display input connector and said power input connector from said power output connector.

3. The system of claim 2 wherein said coupling means comprises
   first latching means located on said monitor, and
   second latching means located on said personality module means for engaging said first latching means to urge said personality module means toward said monitor so as to engage said display signal output connector with said display signal input connector and said power input connector with said power output connector, thereby attaching said personality module means to said monitor, and to urge said personality module means away from said monitor so as to disengage said display signal output connector form said display signal input connector and said power input connector from said power output connector, thereby detaching said personality module means from said monitor.

4. The system of claim 3 wherein said second latching means includes
   a multiple-cut lead screw having an axis,
   a nut into which said multiple-cut lead screw is engaged, and
   rotating means for rotating said multiple-cut lead screw about said axis thereof so as to urge said personality module means and monitor toward and away from each other in accordance with first and second directions of rotation of said rotating means, respectively.

5. The system of claim 4 wherein
   said second latching means further includes a latching tab coupled to and rotatable with said multiple-cut lead screw, said latching tab having first and second bearing surfaces, and
   said first latching means comprises a member on said monitor having an aperture therein and third and fourth bearing surfaces associated therewith,
   said second latching means engaging said first latching means by inserting said latching tab into said aperture and rotating said latching tab with said rotating means so that said first bearing surface engages said third bearing surface to urge said personality module means toward said monitor for said first direction of rotation and so as to engage said second bearing surface with said fourth bearing surface for urging said personality module means away from said monitor for said second direction of rotation.

6. The system of claim 5 wherein said personality module means includes means for capturing said nut and maintaining said nut stationary when said multiple-cut lead screw is rotated.

7. The system of claim 4 wherein said rotating means comprises a lever coupled to said multiple-cut lead screw orthogonal with respect to said axis of said multiple-cut lead screw.

8. The system of claim 7 wherein said second latching means includes first and second detent means for locking said lever in first and second positions, respectively.

9. The system of claim 8 wherein each said first and second detent means comprises
   a protuberance rotatable with said multiple-cut lead screw, and
   a resilient finger stationary with respect to said personality module means,
   said multiple-cut lead screw being prevented from rotating with respect to said nut due to forces applied along said axis thereof by said protuberance engaging said resilient finger.

10. The system of claim 9 wherein said resilient finger of said first and second detent means comprises a single resilient finger.

11. The system of claim 7 wherein said second latching means further includes first and second stop means for limiting rotation of said multiple-cut lead screw by said lever in said first and second directions of rotation, respectively.

12. The system of claim 11 wherein each said first and second stop means comprises
    a first member rotatable with said multiple-cut lead screw, and
    a second member stationary with respect to said personality module means,
    said rotation being stopped by said first member abutting said second member.

13. The system of claim 3 wherein said first and second latching means are located at the bottom of said monitor and personality module means, respectively, said system further including detachable hinge latching means located at the top of said monitor and personality module means.

14. The system of claim 13 wherein said detachable hinge latching means comprises a plurality of hooks engagable into and disengagable from a plurality of apertures.

15. The system of claim 14 wherein said hooks are located on said personality module means and said apertures are located on said monitor.

16. The system of claim 2 wherein
said display signal output connector has a pin-out that is the mirror image of said display signal input connector, and
said circuit card means includes a circuit card having a first side, a second side and solder holes therethrough for soldering said display signal output connector to said first side or said second side of said circuit card to provide pin-out connections that are mirror images with respect to each other.

17. The system of claim 2 wherein said monitor includes a first enclosure with said coupling means constructed and arranged to couple said personality module means at the rear of said first enclosure.

18. The system of claim 1 wherein said coupling means includes
a multiple-cut lead screw having an axis,
a nut into which said multiple-cut lead screw is engaged, and
rotating means for rotating said multiple-cut lead screw about said axis thereof so as to urge said personality module means and monitor toward and away from each other in accordance with first and second directions of rotation of said rotating means, respectively.

19. The system of claim 1 wherein said monitor and personality module means have first and second enclosures, respectively, said first and second enclosures having convection cooling slots therethrough.

20. The system of claim 1 wherein said circuit card means includes a circuit card having solder holes therethrough for soldering an electrical connector to said circuit card, each said solder hole associated with a predetermined electrical signal and having a corresponding solder hole disposed symmetrically therewith with respect to a center line of said electrical connector, said predetermined electrical signal being connected to said solder hole and to said corresponding solder hole, thereby permitting said electrical connector to be soldered to either side of said circuit card with the same effective electrical signal pin-out.

21. The system of claim 1 wherein said circuit card means includes a circuit card having solder holes therethrough for soldering said power input connector to said circuit card, each said solder hole associated with a predetermined electrical signal and having a corresponding solder hole disposed symmetrically therewith with respect to a center line of said power input connector, said predetermined electrical signal being connected to said solder hole and to said corresponding solder hole, thereby permitting said power input connector to be soldered to either side of said circuit card with the same effective electrical signal pin-out.

* * * * *